(12) United States Patent
Kawaguchi et al.

(10) Patent No.: US 10,707,659 B2
(45) Date of Patent: Jul. 7, 2020

(54) PROTECTIVE MEMBER AND WIRE HARNESS (71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Tomoya Kawaguchi, Yokkaichi (JP); Yuichi Kimoto, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/497,160

(22) PCT Filed: Mar. 23, 2018

(86) PCT No.: PCT/JP2018/011713
§ 371 (c)(1),
(2) Date: Sep. 24, 2019

(87) PCT Pub. No.: WO2018/180994
PCT Pub. Date: Oct. 4, 2018

(65) Prior Publication Data
US 2020/0112151 A1  Apr. 9, 2020

(30) Foreign Application Priority Data

Mar. 30, 2017 (JP) .................................. 2017-067437

(51) Int. Cl.
*F16L 57/00* (2006.01)
*H02G 3/32* (2006.01)
(Continued)

(52) U.S. Cl.
CPC ....... *H02G 3/0468* (2013.01); *B60R 16/0215* (2013.01); *F16L 57/00* (2013.01);
(Continued)

(58) Field of Classification Search
CPC .... H02G 3/0468; H02G 3/32; B60R 16/0215; F16L 57/00; H01B 7/0045; B60L 50/70;
(Continued)

(56) References Cited

U.S. PATENT DOCUMENTS 5,829,485 A * 11/1998 Fatato ................. B60R 16/0215
138/121
6,344,614 B1 * 2/2002 Sutehall ............... G02B 6/4419
174/74 R
2008/0099226 A1 * 5/2008 Goch ...................... H02G 7/08
174/41

FOREIGN PATENT DOCUMENTS

JP   2007-228776 A    9/2007
JP   2011-155763 A    8/2011
WO   2013/061623 A1   5/2013

OTHER PUBLICATIONS

May 15, 2018 International Search Report issued in International Patent Application No. PCT/JP2018/011713.

* cited by examiner

*Primary Examiner* — Timothy J Thompson
*Assistant Examiner* — Michael F McAllister
(74) *Attorney, Agent, or Firm* — Oliff PLC (57) ABSTRACT

A protective member for a wire harness, the wire harness including a wire, an exterior material that has flexibility and covers the wire, a route regulator that has an axis extending
(Continued)

along a wiring route of the wire and regulates the wiring route of the wire from outside the exterior material, a fixing member for fixing the route regulator to a vehicle, and at least one connector that connects the route regulator to the exterior material, the protective member being configured to protect the exterior material of the wire harness, the protective member including: a cover for covering the exterior material; an attachment that is to be attached to the exterior material or the route regulator; and a protective member connector that connects the cover and the attachment to each other.

5 Claims, 5 Drawing Sheets

(51) Int. Cl.
    *B60L 50/70*         (2019.01)
    *B60K 6/22*          (2007.10)
    *H02G 3/04*         (2006.01)
    *B60R 16/02*        (2006.01)
    *H01B 7/00*         (2006.01)

(52) U.S. Cl.
    CPC ............. *H01B 7/0045* (2013.01); *H02G 3/32* (2013.01); *B60K 6/22* (2013.01); *B60L 50/70* (2019.02); *B60Y 2200/91* (2013.01); *B60Y 2200/92* (2013.01)

(58) Field of Classification Search
    CPC .... B60K 6/22; B60Y 2200/91; B60Y 2200/92
    USPC ....................................................... 174/72 A
    See application file for complete search history.

PROTECTIVE MEMBER AND WIRE HARNESS

BACKGROUND

The present disclosure relates to a protective member and a wire harness.

As disclosed in JP 2011-155763A, a wire harness is known which includes a spine member for regulating a wiring route of a wire from outside a corrugated tube protecting the wire.

SUMMARY

As described above, the route of a wire protected by a flexible exterior material, such as a corrugated tube, can be regulated by connecting the exterior material to a route-regulating member (spine member). When such a wire harness is routed with an exterior material thereof exposed to the outside of a vehicle, there is a risk that, for example, the exterior material will be damaged by a flying stone or the like while the vehicle is moving. Moreover, when a wire harness is routed with its exterior material located near, for example, a heat-generating portion such as a muffler, the exterior material may be adversely affected by heat.

An exemplary aspect of the disclosure provides a protective member with which an exterior material that covers a wire whose route is regulated by a route-regulating member can be favorably protected, as well as a wire harness.

A protective member according to an exemplary aspect is a protective member for a wire harness, the wire harness including a wire, an exterior material that has flexibility and covers the wire, and a route regulator that has an axis extending along a wiring route of the wire and regulates the wiring route of the wire from outside the exterior material, the protective member being configured to protect the exterior material of the wire harness and including a cover for covering the exterior material, an attachment that is to be attached to the exterior material or the route regulator, and a protective member connector that connects the cover and the attachment to each other.

With this configuration, the protective member can be attached to the exterior material or the route regulator using the attachment thereof. The thus attached protective member includes the cover that covers the exterior material, and therefore, is capable of, for example, causing a stone flying toward the exterior material to rebound therefrom or blocking the conduction of heat from a heat-generating portion to the exterior material.

It is preferable that, in the above-described protective member, the protective member connector has a bend or a curve.

With this configuration, when the cover is impacted, the bend or the curve of the protective member connector serves to buffer the impact, and thus, impact transferred from the cover to the attachment can be suppressed.

It is preferable that, in the above-described protective member, the exterior material has an annular recess, and the attachment has an annular structure that is to be attached to the exterior material and fitted into the annular recess of the exterior material.

With this configuration, displacement of the cover relative to the exterior material can be suppressed.

It is preferable that, in the above-described protective member, the cover has a longitudinal axis extending in an axial direction of the exterior material, and an outer face of the cover that is on the opposite side to the exterior material side has a curved surface that is curved convexly so as to conform to an outer circumference of the exterior material.

With this configuration, the exterior material can be protected over a wider area.

A wire harness according to an exemplary aspect includes a wire, an exterior material that has flexibility and covers the wire, and a route regulator that has an axis extending along a wiring route of the wire and regulates the wiring route of the wire from outside the exterior material, the wire harness further including a protective member that protects the exterior material, the protective member including a cover that covers the exterior material, an attachment that is attached to the exterior material or the route regulator, and a protective member connector that connects the cover and the attachment to each other.

According to the present disclosure, an exterior material that covers a wire whose route is regulated by a route regulator can be favorably protected.

DETAILED DESCRIPTION OF EMBODIMENTS

Hereinafter, an embodiment of a protective member and a wire harness will be described.

Figure 1:
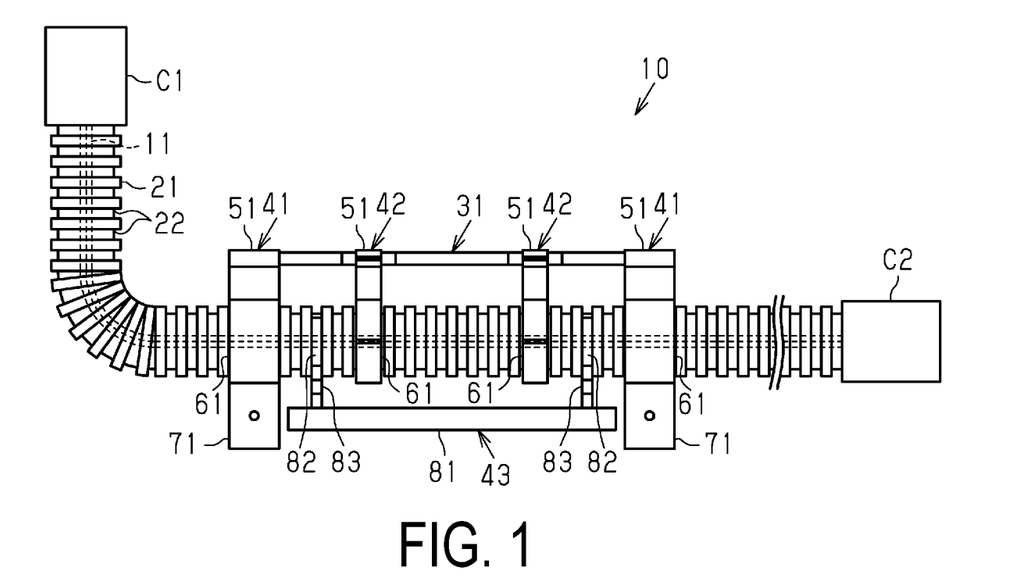
FIG. 1 is a schematic plan view showing a wire harness of an embodiment.

As shown in FIG. 1, a wire harness 10 for a vehicle includes a wire 11, an exterior material 21 that has flexibility and covers the wire 11, and a route-regulating member 31 (route regulator) that regulates a wiring route of the wire 11 from outside the exterior material 21. The wire harness 10 further includes a fixing member 41 for fixing the route-regulating member 31 to the vehicle and a connecting member 42 (connector) that connects the route-regulating member 31 to the exterior material 21. The wire harness 10 yet further includes a protective member 43.

Routing Manner

Figure 2:
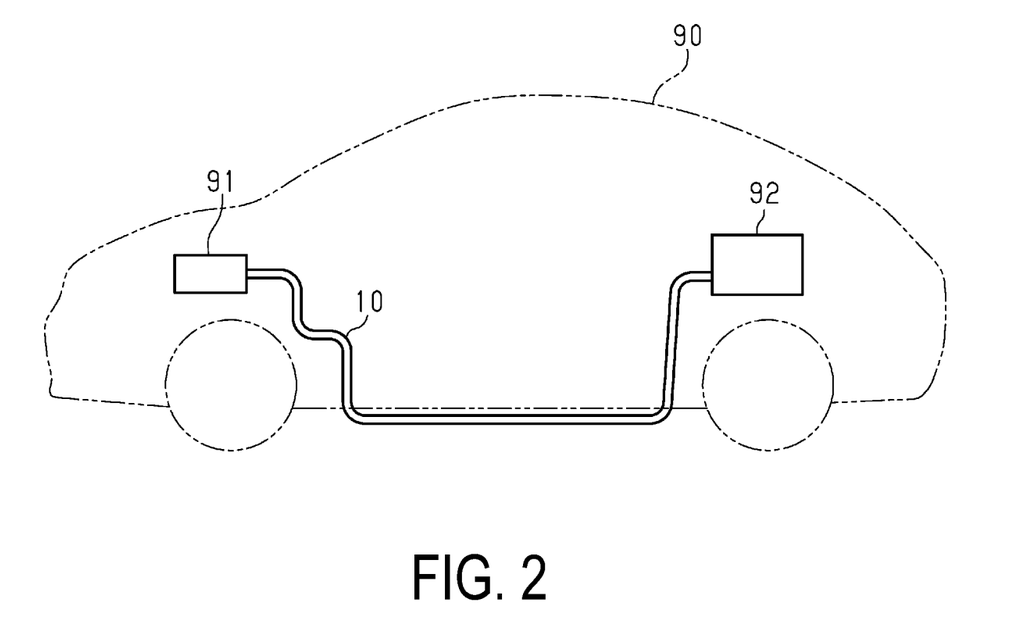
FIG. 2 is a schematic diagram illustrating a manner in which the wire harness is routed in a vehicle.

As shown in FIG. 2, the wire harness 10 is used to electrically connect a first device 91 and a second device 92 installed in a vehicle 90 to each other. The first device 91 is disposed on a front side of the vehicle 90. The second device 92 is disposed on a rear side of the vehicle 90. For example, one of the first device 91 and the second device 92 is a battery, and the other is an inverter. Note that it is also possible that one of the first device 91 and the second device 92 is a motor, and the other is an inverter. Examples of the vehicle 90 include an electric automobile, a hybrid automobile, a fuel-cell automobile, and the like. The wire harness 10 of the present embodiment is routed under the floor of the vehicle 90.

Wire 11

The wire 11 has a core wire that has conductivity and an insulating coating that has an insulating property. The core wire is made of a conductive material such as copper or aluminum, for example. The core wire is composed of a single strand or a plurality of strands. As is well known, the insulating coating is made of an insulating material such as polyvinyl chloride and formed into a tubular shape.

As shown in FIG. 1, opposite end portions of the wire 11 are constituted by connector portions C1 and C2, respectively. The wire 11 is a high-voltage wire and is electrically connected to input/output terminals of the first device 91 and the second device 92 installed in the vehicle 90. A high-voltage wire for a vehicle has a rated voltage of greater than 30 V for AC, or greater than 60 V for DC. Note that a high-voltage wire for a vehicle has a rated voltage of 600 V or less for AC, or 750 V or less for DC.

The wire 11 may include a shielding material for shielding electromagnetic waves, or a shielding material for shielding electromagnetic waves may be separately disposed over the outer circumference of the wire 11. For example, a braided member that has a structure in which metal strands made of aluminum, stainless steel, copper, or an alloy thereof, etc. are braided into a mesh can be favorably used as the shielding material.

Exterior Material 21

The exterior material 21 has flexibility and is thus configured to be able to deform to conform to the wiring route of the wire 11. The exterior material 21 covers the wire 11, thereby protecting the wire 11. The exterior material 21 is formed into a tubular shape that has a longitudinal axis, and the wire 11 is arranged in an inner space of the exterior material 21. In light of weight reduction, for example, it is preferable that the exterior material 21 is made of a resin material. Examples of the resin material include polyolefins, polyamides, polyesters, ABS resins, and the like. Specific examples of the exterior material 21 include a corrugated tube, a hard resin pipe, and the like.

The exterior material 21 of the present embodiment is a corrugated tube and has a structure in which a plurality of annular recesses 22 are arranged in the longitudinal axis direction, and thus, is configured to be able to be easily curved or bent.

The exterior material 21 may also have a slit extending in the longitudinal axis direction. In the case where the exterior material 21 has a slit, the wire 11 can be arranged inside the exterior material 21 through the slit. Note that in the case where the exterior material 21 has a slit, the wire 11 can be prevented from protruding through the slit by winding a binding material, such as pressure-sensitive adhesive tape, around the outer circumference of the exterior material 21 as necessary.

Route-Regulating Member 31

The route-regulating member 31 has an axis extending along the wiring route of the wire 11. The route-regulating member 31 is arranged so as to partially regulate the route of the wire 11 from outside the exterior material 21. The number of route-regulating members 31 constituting the wire harness 10 may be one or more. That is to say, in the wire harness 10, a plurality of sections of the wire 11 may be regulated by a plurality of route-regulating members 31, or a single section of the wire 11 may be regulated by a single route-regulating member 31. Also, the route-regulating member 31 may be composed of only a straight portion, or may also have a curved portion.

The route-regulating member 31 can be formed through cutting in which, for example, a pipe-shaped or bar-shaped member is cut to a predetermined length, bending in which a pipe-shaped or bar-shaped member is deformed so as to conform to the wiring route of the wire 11, or the like. Alternatively, the route-regulating member 31 can also be molded in a mold.

The route-regulating member 31 is made of a material that is stiff enough to maintain the route of the wire 11 that is arranged inside the exterior material 21. Preferably, the route-regulating member 31 is made of a plastically deformable material. A metal material is favorably used as the material of the route-regulating member 31. Examples of the metal material include aluminum, iron, copper, alloys of these metals, and the like. Note that the route-regulating member 31 may also be pipe-shaped, and in that case, for example, a signal line can also be routed inside the route-regulating member 31.

Fixing Member 41 and Connecting Member 42

As shown in FIG. 1, each of the fixing member 41 and the connecting member 42 has a support portion 51 that supports the route-regulating member 31 and an attachment portion 61 to which the exterior material 21 is attached. The fixing member 41 further has a fixed portion 71 that is to be fixed to the vehicle 90.

Figure 3:
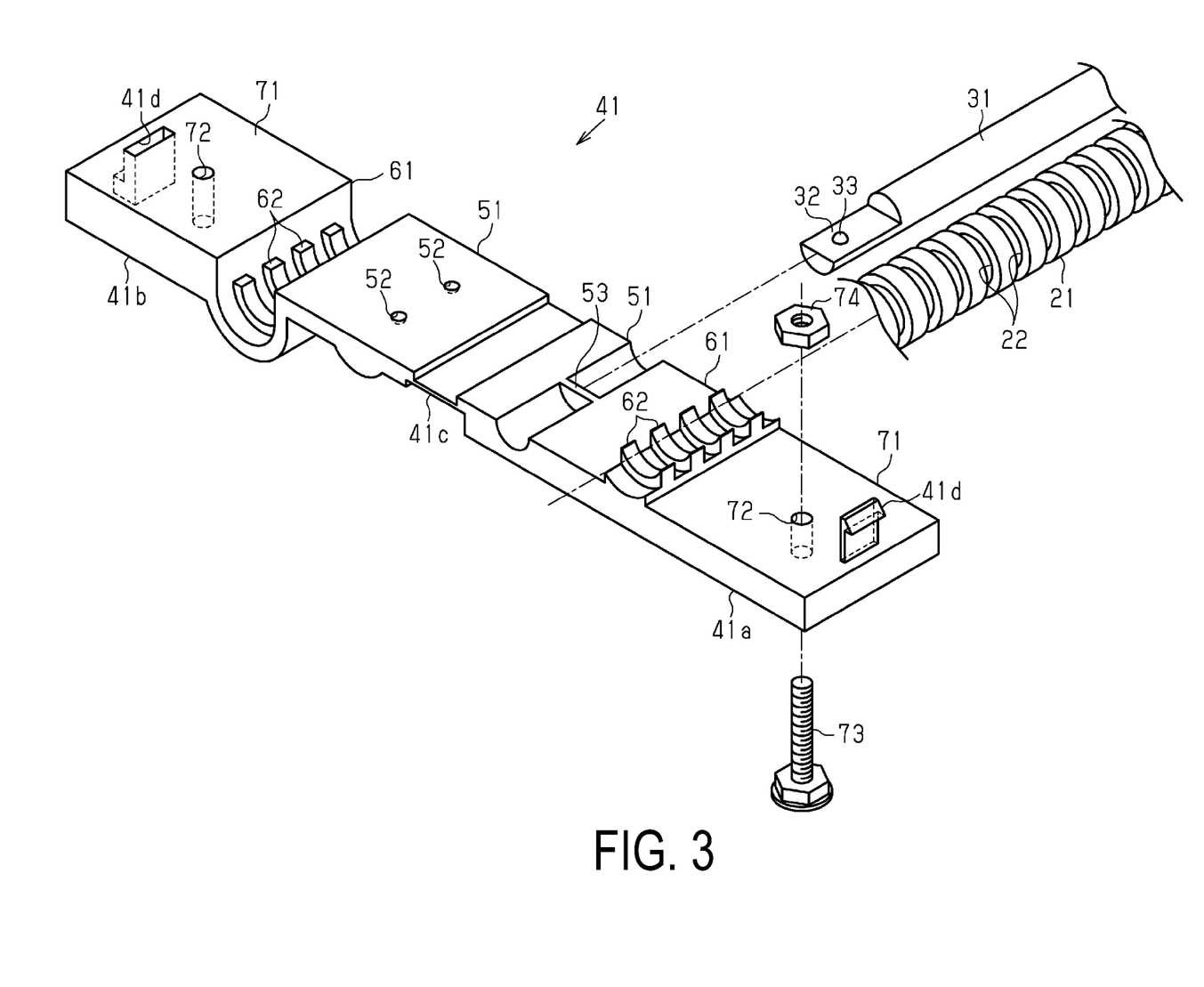
FIG. 3 is an exploded perspective view of a portion of the wire harness.
Figure 4:
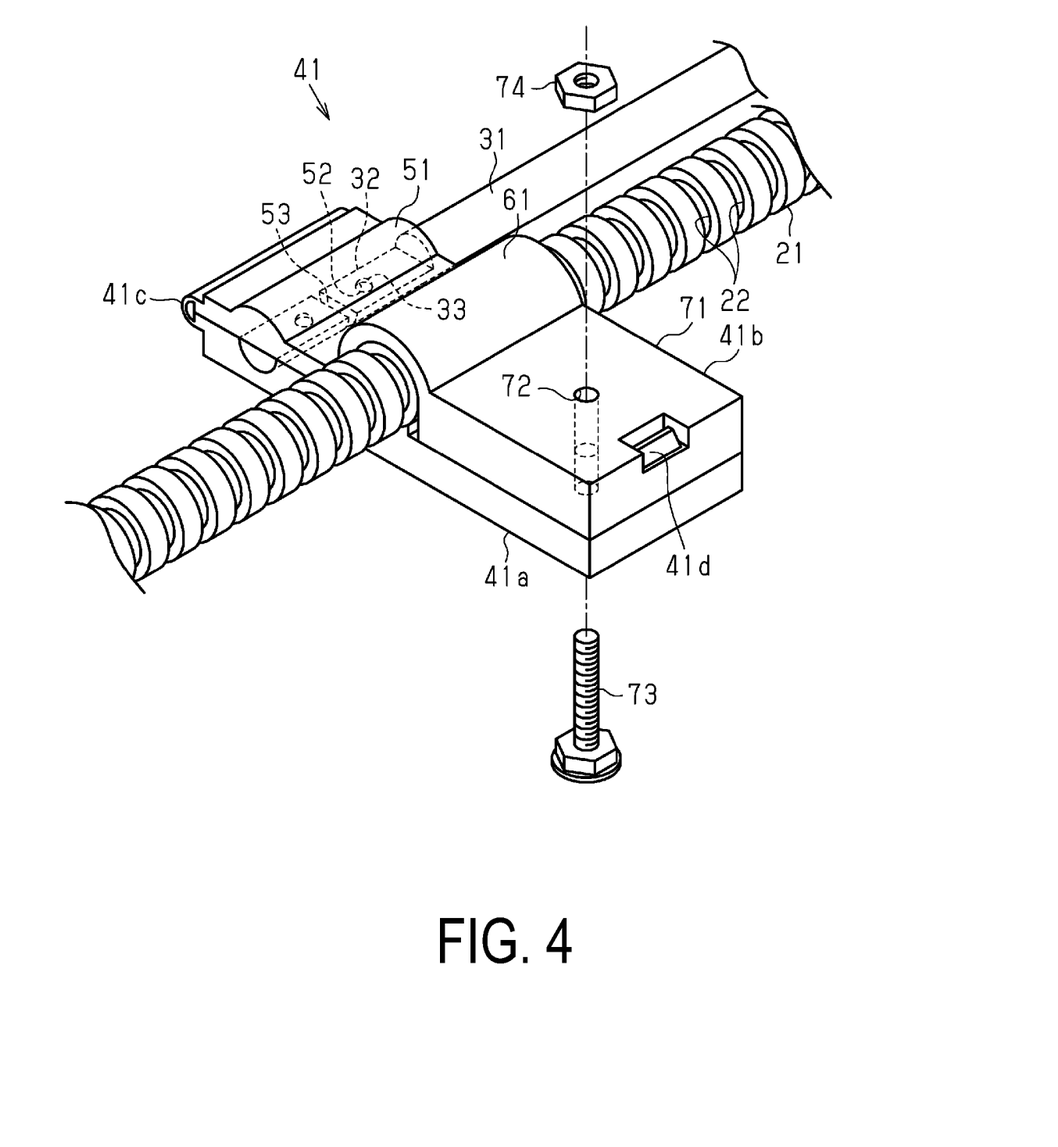
FIG. 4 is a partial perspective view of the wire harness.

As shown in FIGS. 3 and 4, in the fixing member 41, the support portion 51 that supports the route-regulating member 31 has an annular structure. The annular structure has a non-circular inner circumferential shape that fits to an end portion 32, which serves as a supported portion, of the route-regulating member 31 and thereby restricts the route-regulating member 31 from rotating about its axis.

In other words, in the route-regulating member 31, the end portion 32 that is supported by the support portion 51 of the fixing member 41 has a non-circular outer circumferential shape that fits into the annular structure of the support portion 51 and thereby causes the route-regulating member 31 to be restricted from rotating about its axis. The end portion 32 of the route-regulating member 31 has a semi-circular outer circumferential shape, for example. The annular structure of the support portion 51 of the fixing member 41 has an inner circumferential shape that corresponds to the shape of the end portion 32 of the route-regulating member 31 and that is semicircular, for example.

A locking projection 33 is provided on the end portion 32 of the route-regulating member 31. The route-regulating member 31 is restricted from moving in the axial direction relative to the support portion 51, by the locking projection 33 locking into the support portion 51 of the fixing member 41. In other words, the support portion 51 of the fixing member 41 has a locking recess 52 for locking to the locking projection 33 of the route-regulating member 31, and restricts the route-regulating member 31 from moving in the axial direction.

The support portion 51 of the fixing member 41 has a wall portion 53 against which an end surface of the route-regulating member 31 in the axial direction can abut.

Next, the attachment portion 61 and the fixed portion 71 of the fixing member 41 will be described.

A middle portion of the exterior material 21 in the longitudinal axis direction is attached to the attachment portion 61 of the fixing member 41. The attachment portion 61 has an annular structure that matches the outer circumferential shape of the exterior material 21. An inner circumferential surface of the annular structure of the attachment portion 61 has an attachment projection 62 that fits into an annular recess 22 in the outer circumferential surface of the exterior material 21 (corrugated tube). In the present embodiment, the inner circumferential surface of the annular structure of the attachment portion 61 has a plurality of attachment projections 62 so as to fit into a plurality of annular recesses 22 that are arranged in the longitudinal axis direction of the exterior material 21, but the inner circumferential surface of the annular structure of the attachment portion 61 may also have only one attachment projection 62.

The fixed portion 71 of the fixing member 41 has a through hole 72 into which a bolt 73 is to be inserted. The fixing member 41 can be fixed to the vehicle 90 using the bolt 73 and a nut 74. The bolt 73 may be welded to the vehicle 90 in advance. Note that the fixed portion 71 of the fixing member 41 may be, for example, a clip for locking into an attachment hole provided in the vehicle 90.

Next, details of the structure of the fixing member 41 of the present embodiment will be described.

As shown in FIGS. 3 and 4, the fixing member 41 has a first main body portion 41a and a second main body portion 41b, as well as a connecting portion 41c that connects the first main body portion 41a and the second main body portion 41b to each other so that the first main body portion 41a and the second main body portion 41b can rotate relative to each other. The connecting portion 41c functions as a hinge, and thus, the first main body portion 41a and the second main body portion 41b of the fixing member 41 are configured to be able to be openably closed from an opened position shown in FIG. 3 to a closed position shown in FIG. 4. When the fixing member 41 is in the closed position, the first main body portion 41a and the second main body portion 41b are arranged superposed one on top of the other, and the above-described support portion 51, attachment portion 61, and fixed portion 71 are formed. In the fixing member 41 that is in the closed position, the support portion 51, the attachment portion 61, and the fixed portion 71 are sequentially arranged in ascending order of distance from the connecting portion 41c.

The fixing member 41 has a locking mechanism 41d that maintains the fixing member 41 in the closed position. The locking mechanism 41d of the present embodiment is constituted by a locking claw provided on the first main body portion 41a and a locking hole formed in the second main body portion 41b. Note that the locking mechanism 41d may also have a configuration in which a locking hole is provided in the first main body portion 41a and a locking claw is provided in the second main body portion 41b, or the locking mechanism 41d may be changed to another well-known locking mechanism other than a locking claw and a locking hole.

Next, the connecting member 42 will be described.

As shown in FIG. 1, the wire harness 10 includes a plurality of connecting members 42 that connect the route-regulating member 31 to the exterior material 21. Unlike the fixing member 41, the plurality of connecting members 42 are not fixed to the vehicle 90.

Figure 5:
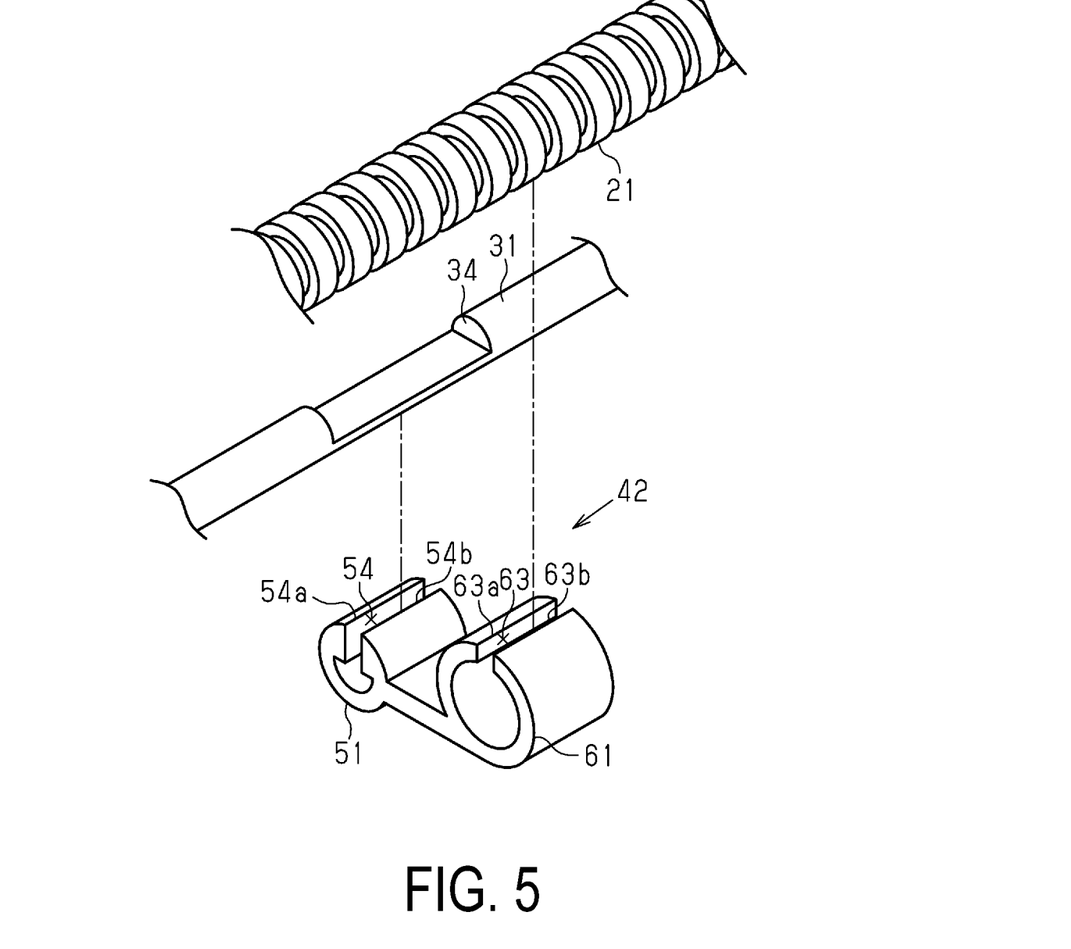
FIG. 5 is an exploded perspective view of a portion of the wire harness.

As shown in FIG. 5, the support portion 51 of each connecting member 42 that supports the route-regulating member 31 has an annular structure that matches the outer circumferential shape of the route-regulating member 31. The annular structure has a non-circular inner circumferential shape that fits to a supported portion of the route-regulating member 31 and thereby restricts the route-regulating member 31 from rotating about its axis.

In other words, in the route-regulating member 31, the supported portion that is supported by the support portion 51 of the connecting member 42 has a non-circular outer circumferential shape that fits into the annular structure of the support portion 51 and thereby causes the route-regulating member 31 to be restricted from rotating about its axis. The supported portion of the route-regulating member 31 has a semicircular outer circumferential shape, for example. The annular structure of the support portion 51 of the connecting member 42 has an inner circumferential shape that corresponds to the shape of the supported portion of the route-regulating member 31 and that is semicircular, for example.

The annular structure of the support portion 51 of the connecting member 42 has an insertion portion 54 through which the route-regulating member 31 can be inserted along the radial direction of the annular structure. That is to say, the annular structure of the support portion 51 is a discontinuous annular structure and has a first end portion 54a and a second end portion 54b that opposes the first end portion 54a while being spaced apart from the first end portion 54a. The annular structure of the support portion 51 is configured to be deformable between a first form that allows the route-regulating member 31 to be inserted from the insertion portion 54 between the first end portion 54a and the second end portion 54b and a second form that allows the route-regulating member 31 inserted from the inserted insertion portion 54 to be supported. That is to say, the annular structure of the support portion 51 is elastically deformable so that the distance (width of the insertion portion 54) between the first end portion 54a and the second end portion 54b can be increased. Note that the support portion 51 of the connecting member 42 may be configured such that when its annular structure is in the second form, the first end portion 54a and the second end portion 54b are in contact with each other.

Next, the attachment portion 61 of the connecting member 42 will be described.

As shown in FIG. 5, a middle portion of the exterior material 21 in the longitudinal axis direction is attached to the attachment portion 61 of the connecting member 42. The attachment portion 61 has an annular structure that matches the outer circumferential shape of the exterior material 21. The annular structure of the attachment portion 61 has an insertion portion 63 through which the exterior material 21 can be inserted along the radial direction of the annular structure. That is to say, the annular structure of the attachment portion 61 is a discontinuous annular structure and has a first end portion 63a and a second end portion 63b that opposes the first end portion 63a while being spaced apart from the first end portion 63a. The annular structure of the attachment portion 61 is configured to be deformable from a first form that allows the exterior material 21 to be inserted from the insertion portion 63 between the first end portion 63a and the second end portion 63b and a second form that allows the exterior material 21 inserted from the insertion portion 63 to be supported. That is to say, the annular structure of the attachment portion 61 is elastically deformable so that the distance (width of the insertion portion 63) between the first end portion 63a and the second end portion 63b can be increased. Note that the attachment portion 61 of the connecting member 42 may be configured such that when its annular structure is in the second form, the first end portion 63a and the second end portion 63b are in contact with each other.

The fixing members 41 and the connecting members 42, which have been described in detail above, can be made of a metal material or a resin material. Preferably, the fixing members 41 and the connecting members 42 are made of a resin material in light of weight reduction, for example. Examples of the resin material include polyolefins, polyamides, polyesters, ABS resins, and the like.

Protective Member 43

As shown in FIG. 1, the protective member 43 includes a protecting portion 81 (cover) that covers the exterior material 21, attachment portions 82 (attachments) that are attached to the exterior material 21, and connecting portions 83 (protective member connector) that connect the protecting portion 81 to the attachment portions 82. The protecting portion 81 is arranged in parallel with the route-regulating member 31. The attachment portions 82 and the connecting portions 83 of the present embodiment are provided such that the protecting portion 81 is supported at two points, but may also be provided such that the protecting portion 81 is supported at one point or three or more points.

Figure 6:
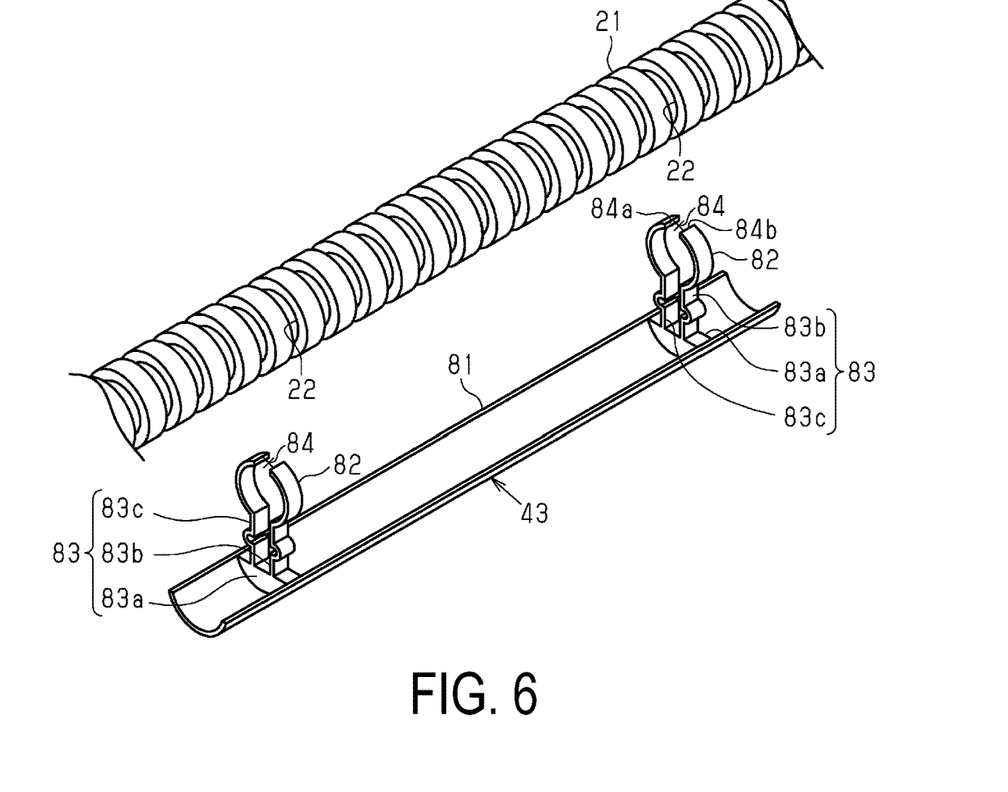
FIG. 6 is an exploded perspective view of a portion of the wire harness.

FIG. 6 shows the exterior material 21 and the protective member 43, and the other components are omitted in this drawing. As shown in FIG. 6, the protecting portion 81 has a longitudinal axis extending in an axial (longitudinal axis) direction of the exterior material 21. An outer face of the protecting portion 81 that is on the opposite side to the exterior material 21 side has a curved surface that is curved convexly so as to conform to the outer circumference of the exterior material 21. A face (inner face) of the protecting portion 81 that is on the side opposing the exterior material 21 has, for example, a concavely curved surface.

Figure 7A:
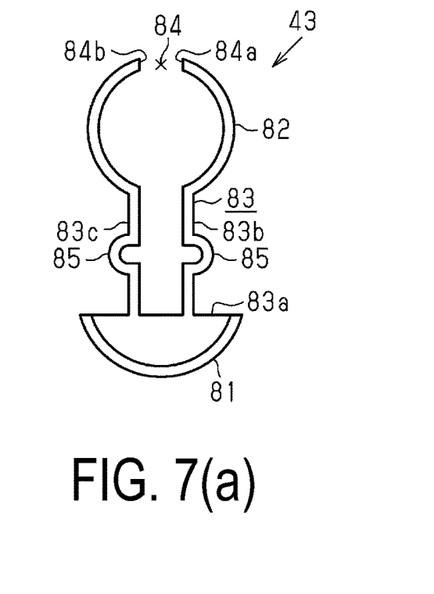
FIG. 7(a) is a side view showing a protective member.

As shown in FIGS. 6 and 7(*a*), each attachment portion 82 of the protective member 43 has an annular structure that matches the outer circumferential shape of the exterior material 21. The annular structure of the attachment portion 82 is configured to fit into an annular recess 22 of the exterior material 21. The annular structure of the attachment portion 82 has an insertion portion 84 through which the exterior material 21 can be inserted along the radial direction of the annular structure. That is to say, the annular structure of the attachment portion 82 is a discontinuous annular structure and has a first end portion 84*a* and a second end portion 84*b* that opposes the first end portion 84*a* while being spaced apart from the first end portion 84*a*. The annular structure of the attachment portion 82 is configured to be deformable between a first form that allows the exterior material 21 to be inserted therein from the insertion portion 84 between the first end portion 84*a* and the second end portion 84*b* and a second form that allows the exterior material 21 inserted therein from the insertion portion 84 to be supported. That is to say, the annular structure of the attachment portion 82 is elastically deformable so that the distance (width of the insertion portion 84) between the first end portion 84*a* and the second end portion 84*b* can be increased. Note that the attachment portion 82 of the protective member 43 may also be configured such that when the annular structure is in the second form, the first end portion 84*a* and the second end portion 84*b* are in contact with each other.

As shown in FIG. 7(*a*), each connecting portion 83 of the protective member 43 has a base portion 83*a* that is connected to the protecting portion 81 and a pair of connecting portions 83*b* and 83*c* that connect the base portion 83*a* and the attachment portion 82 to each other. The connecting portions 83*b* and 83*c* can be formed into a plate-like shape, for example. Each of the connecting portions 83*b* and 83*c* has a curved portion 85.

The protective member 43 can be made of a metal material or a resin material. Preferably, the protective member 43 is made of a resin material in light of weight reduction, for example. Examples of the resin material include polyolefins, polyamides, polyesters, ABS resins, and the like.

Production Method

Next, an example of a method for producing the wire harness 10 will be described.

With the fixing member 41 of the present embodiment, when closing the fixing member 41 from the opened position shown in FIG. 3 to the closed position shown in FIG. 4, it is possible to make the route-regulating member 31 be supported by the support portion 51 and attach the exterior material 21 to the attachment portion 61.

In the connecting member 42 shown in FIG. 5, the support portion 51 and the attachment portion 61 have the respective insertion portions 54 and 63. Therefore, for example, even after the end portion 32 of the route-regulating member 31 is made to be supported by the support portion 51 of the fixing member 41, it is possible to make the middle portion 34 of the route-regulating member 31 be supported by the connecting member 42. Moreover, even after the exterior material 21 is attached to the attachment portion 61 of the fixing member 41, it is also possible to attach the exterior material 21 to the attachment portion 61 of the connecting member 42 by inserting the exterior material 21 from the insertion portion 63 along the radial direction of the attachment portion 61 of the connecting member 42.

Each attachment portion 82 of the protective member 43 shown in FIGS. 6 and 7(*a*) has the insertion portion 84. Therefore, even after the exterior material 21 is attached to the fixing member 41 and the connecting member 42, it is possible to attach the protective member 43 to the exterior material 21. Note that the wire 11 may be arranged inside the exterior material 21 either before or after the exterior material 21 is attached to the fixing member 41 and the connecting member 42.

Next, the effects of the present embodiment will be described.

(1) The wire harness 10 includes the wire 11, the exterior material 21, the route-regulating member 31, the fixing member 41, and the connecting member 42. In this wire harness 10 for a vehicle, the protective member 43 that protects the exterior material 21 includes the protecting portion 81 that covers the exterior material 21, the attachment portion 82 that is attached to the exterior material 21, and the connecting portion 83 that connects the protecting portion 81 and the attachment portion 82 to each other.

With this configuration, the protective member 43 can be attached to the exterior material 21 using the attachment portion 82 thereof. The thus attached protective member 43 includes the protecting portion 81 that covers the exterior material 21, and therefore, is capable of, for example, causing a stone flying toward the exterior material 21 to rebound therefrom or blocking the conduction of heat from a heat-generating portion to the exterior material 21. Accordingly, the exterior material 21 that covers the wire 11 whose route is regulated by the route-regulating member 31 can be favorably protected.

(2) The connecting portion 83 of the protective member 43 has the curved portions 85. When the protecting portion 81 is impacted, the curved portions 85 serve to buffer the impact, and thus, impact transferred from the protecting portion 81 to the attachment portion 82 can be suppressed. Accordingly, detachment of the attachment portion 82 from the exterior material 21 can be suppressed, and impact transferred to the exterior material 21 via the attachment portion 82 can be reduced. Therefore, the exterior material 21 that covers the wire 11 whose route is regulated by the route-regulating member 31 can be more favorably protected.

(3) The exterior material 21 has the annular recesses 22. The attachment portion 82 of the protective member 43 has the annular structure that is attached to the exterior material 21 and fitted into an annular recess 22 of the exterior material 21. In this case, displacement of the protecting portion 81 relative to the exterior material 21 can be suppressed. Therefore, the exterior material 21 that covers the wire 11 whose route is regulated by the route-regulating member 31 can be more favorably protected.

(4) The protecting portion 81 of the protective member 43 has the longitudinal axis extending in the axial (longitudinal axis) direction of the exterior material 21. The outer face of the protecting portion 81 that is on the opposite side to the exterior material 21 side has the curved surface that is curved convexly so as to conform to the outer circumference of the exterior material 21. In this case, the exterior material 21 can be protected over a wider area.

The foregoing embodiment may be modified and configured as follows.

The fixing member 41 has the attachment portion 61 to which the exterior material 21 is attached, but this attachment portion 61 can also be omitted. That is to say, although the fixing member 41 for fixing the route-regulating member 31 to the vehicle 90 also has the function of a connecting member for connecting the route-regulating member 31 to the exterior material 21, the function of the connecting member may be omitted. In this case, it is preferable that a connecting member is provided near the fixing member.

The fixing member 41 is not limited to the configuration shown in FIGS. 3 and 4, and a well-known configuration may be adopted as the fixing member 41. The shape of the route-regulating member 31 may also be changed so as to suit the adopted configuration.

The position at which the route-regulating member 31 is supported by the fixing member 41 and the number of fixing members 41 may also be changed. For example, the number of fixing members 41 used to fix the route-regulating member 31 to the vehicle 90 may be one, or three or more.

A well-known configuration (e.g., pressure-sensitive adhesive tape, a cable tie, or the like) that can perform the function of connecting the route-regulating member 31 to the exterior material 21 may be adopted as the connecting member 42.

The position at which the route-regulating member 31 is supported by the connecting member 42 and the number of connecting members 42 may also be changed. For example, the number of connecting members 42 used to connect the route-regulating member 31 to the exterior material 21 may be one, or three or more.

Figure 7B:
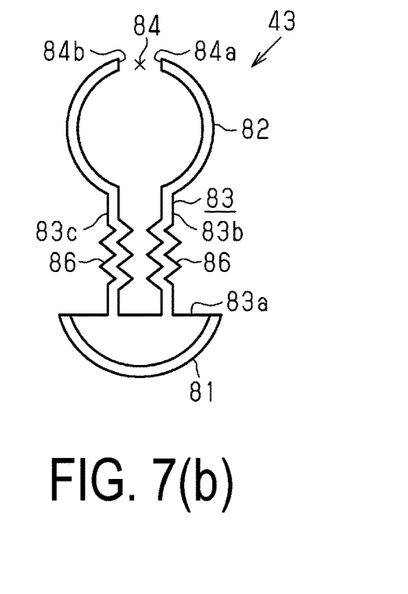
FIG. 7(b) is a side view showing a protective member of a modification.

As shown in FIG. 7(b), the curved portions 85 of the protective member 43 may be changed to bent portions 86. In this case as well, the effects described in the clause (2) above can be obtained.

The curved portions 85 of the protective member 43 may also be omitted.

In the protective member 43, the insertion portion 84 of the attachment portion 82 may be omitted.

The outer face of the protecting portion 81 of the protective member 43 is not limited to a curved surface, and may have a flat surface, for example. Moreover, the outer face of the protecting portion 81 may have both a curved surface and a flat surface, for example.

The protecting portion 81 of the protective member 43 has the longitudinal axis extending in the axial (longitudinal axis) direction of the exterior material 21, but the present disclosure is not limited to this, and the protecting portion 81 may have a longitudinal axis extending in the circumferential direction or the radial direction of the exterior material 21.

The connecting portion 83 of the protective member 43 has the pair of connecting portions 83b and 83c, but the present disclosure is not limited to this, and the connecting portion 83 may be constituted by a single connecting portion.

The connecting portion 83 of the protective member 43 has the base portion 83a, but the present disclosure is not limited to this, and the connecting portion 83 may be constituted by only the connecting portions 83b and 83c.

The attachment portion 82 of the protective member 43 has the annular structure that is to be fitted into an annular recess 22 of the exterior material 21, but the present disclosure is not limited to this, and the configuration of the attachment portion 82 may be changed so that the attachment portion 82 is attached to the exterior material 21 without being fitted into an annular recess 22.

The configuration of the attachment portion 82 of the protective member 43 may be changed so that the attachment portion 82 is attached to the route-regulating member 31.

The wire harness 10 may include a single protective member 43 or a plurality of protective members 43.

The wire 11 of the wire harness 10 may also be a low-voltage wire, and the portions electrically connected by the wire harness 10 can also be changed as appropriate.

Constituent elements of the above-described embodiment and modifications may be combined.

It will be apparent to those skilled in the art that the present disclosure may be embodied in other specific forms without departing from the technical ideas thereof. For example, some of the components described in the embodiment (or one or more variations thereof) may be omitted, or some of the components may be combined.

The invention claimed is:

1. A protective member for a wire harness,
the wire harness including a wire, an exterior material that has flexibility and covers the wire, a route regulator that has an axis extending along a wiring route of the wire and regulates the wiring route of the wire from outside the exterior material, a fixing member for fixing the route regulator to a vehicle, and at least one connector that connects the route regulator to the exterior material,
the protective member being configured to protect the exterior material of the wire harness, the protective member comprising:
a cover for covering the exterior material;
an attachment that is to be attached to the exterior material or the route regulator; and
a protective member connector that connects the cover and the attachment to each other,
the cover having a longitudinal axis extending in an axial direction of the exterior material, and
an outer face of the cover that is on an opposite side to an exterior material side having a shape that conforms to an outer circumference of the exterior material.

2. The protective member according to claim 1,
wherein the protective member connector has a bend or a curve.

3. The protective member according to claim 1,
wherein the exterior material has an annular recess, and the attachment has an annular structure that is to be attached to the exterior material and fitted into the annular recess of the exterior material.

4. The protective member according to claim 1,
wherein the outer face of the cover that is on an opposite side to the exterior material side has a curved surface that is curved convexly so as to conform to the outer circumference of the exterior material.

5. A wire harness comprising:
a wire;
an exterior material that has flexibility and covers the wire;
a route regulator that has an axis extending along a wiring route of the wire and regulates the wiring route of the wire from outside the exterior material;
a fixing member for fixing the route regulator to a vehicle; and
at least one connector that connects the route regulator to the exterior material,
the wire harness further comprising a protective member that protects the exterior material,
the protective member including:
  a cover that covers the exterior material;
  an attachment that is attached to the exterior material or the route regulator; and
  a protective member connector that connects the cover and the attachment to each other,
the cover having a longitudinal axis extending in an axial direction of the exterior material, and
an outer face of the cover that is on an opposite side to an exterior material side having a shape that conforms to an outer circumference of the exterior material.

\* \* \* \* \*